(12) United States Patent
Griffin et al.

(10) Patent No.: US 8,547,786 B2
(45) Date of Patent: Oct. 1, 2013

(54) ESTIMATING AND USING SLOWNESS VECTOR ATTRIBUTES IN CONNECTION WITH A MULTI-COMPONENT SEISMIC GATHER

(75) Inventors: Jeffrey E. Griffin, Massimiliano Vassallo (GB); Clement Kostov, Great Wilbraham (GB); Alfonso Gonzalez, Sugar Land, TX (US)

(73) Assignee: WesternGeco L.L.C., Houston, TX (US)

( * ) Notice: Subject to any disclaimer, the term of this patent is extended or adjusted under 35 U.S.C. 154(b) by 690 days.

(21) Appl. No.: 11/771,947

(22) Filed: Jun. 29, 2007

(65) Prior Publication Data
US 2009/0003132 A1 Jan. 1, 2009

(51) Int. Cl.
*G01V 1/38* (2006.01)
(52) U.S. Cl.
CPC .......... *G01V 1/38* (2013.01); *G01V 2210/6222* (2013.01); *G01V 2210/61* (2013.01)
USPC .......................................................... 367/24
(58) Field of Classification Search
USPC .......... 367/15, 20, 21, 47, 149, 153; 181/110
See application file for complete search history.

(56) References Cited

U.S. PATENT DOCUMENTS

| | | | |
|---|---|---|---|
| 6,691,039 B1* | 2/2004 | Wood .............................. | 702/17 |
| 6,894,948 B2* | 5/2005 | Brittan et al. ................... | 367/24 |
| 6,944,094 B1* | 9/2005 | Thomsen et al. ............... | 367/57 |
| 7,068,568 B2* | 6/2006 | Robertsson ..................... | 367/24 |
| 7,366,054 B1* | 4/2008 | Wood .............................. | 367/43 |
| 7,386,397 B2* | 6/2008 | Amundsen et al. ............. | 702/14 |
| 7,454,292 B2* | 11/2008 | Wang et al. ..................... | 702/17 |
| 2002/0116160 A1* | 8/2002 | Lailly et al. ....................... | 703/5 |
| 2004/0117122 A1* | 6/2004 | Choo et al. ..................... | 702/14 |
| 2005/0090987 A1* | 4/2005 | Amundsen et al. ............. | 702/14 |
| 2006/0250890 A1* | 11/2006 | van den Berg et al. ......... | 367/24 |
| 2007/0115755 A1 | 5/2007 | Grechka et al. | |
| 2008/0147763 A1* | 6/2008 | Levin ............................ | 708/400 |

FOREIGN PATENT DOCUMENTS

| | | | |
|---|---|---|---|
| GB | 2379505 A | * | 3/2003 |
| GB | 2387440 A | | 10/2003 |
| WO | 2002073239 A1 | | 9/2002 |
| WO | 2006078416 | | 7/2006 |

OTHER PUBLICATIONS

Ringdal et al., "Adaptive Waveform Correlation Detectors for arrays: Algorithms for Autonomous Calibration", 27th Seismic Research Review: Ground-based Nuclear Explosion Monitoring Technologies, pp. 413-422; https://www.nemre.nnsa.doe.gov/srr/2005/PAPERS/02-15.PDF.*

Ringdal et al. "Adaptive waveform Correlation Detectors for arrays:Algorithms for Autonomous Calibration," 27th Seismic Research Review:Ground-Based Nuclear Explosion Monitoring Technologies, pp. 413-422; https://www.nemre.nnsa.doe.gov/srr/2005/PAPERS/02-15.PDF.*

(Continued)

*Primary Examiner* — Krystine Breier
(74) *Attorney, Agent, or Firm* — Gary Gex; Patrick Triaster

(57) ABSTRACT

A technique includes determining at least one attribute of a slowness vector associated with a seismic gather based on pressure data and an indication of particle motion that is measured by at least one seismic sensor while in tow.

47 Claims, 16 Drawing Sheets

(56) References Cited

OTHER PUBLICATIONS

Wood et al. "Strain and Anisotropy in Rocks", Philosophical Transactions of the Royal Society of London. Series A, Mathematical and Physical Sciences, vol. 283, No. 1312, A Discussion on Natural Strain and Geological Structre (Oct. 12, 1976), pp. 27-42).*

Ringdal et al. "Adaptive waveform Correlation Detectors for arrays: Alogrithms for Autonomous Calibration," 27th Seismic Research Review: Ground-based Nuclear Explosion Monitoring Techniques, pp. 413-422; https:www.nemre.nnsa.doe.gov/srr/2005/PAPERS/02-15.PDF.*

Reed, "Seismic anisotropy in the tau-p domain," Lithos Science Report, Jun. 2003, 5, 33-36; http://lithos.esc.cam.ac.uk/~lithos/report_2003/reed_so.pdf.*

Wood et al., "Strain and Anisotropy in Rocks", Philosophical Transactions of the Royal Society of London. Series A, Mathematical and Physical Sciences, vol. 283, No. 1312, A Discussion on Natural Strain and Geological Structure (Oct. 12, 1976), pp. 27-42.*

Wunsch, "The Work Done by the Wind on Oceanic General Circulation", Journal of Physical Oceanography, Oct. 21, 1997.*

Ringdal et al. "Adaptive waveform Correlation Detectors for arrays: Algorithms for Autonomous Calibration," 27th Seismic Research Review: GRound-based Nuclear Explosition Monitoring Techniques, pp. 413-422; https://www.nemre.nnsa.doe.gov/srr/2005/PAPERS/02-15.PDF.*

Reed, "Seismic anisotropy in the tau-p domain," Lithos Science Report, Jun. 2003, 5, 33-36; http://lithos.esc.cam.ac.uk/~lithos/report_2003/reed_sp.pdf.*

Fomel, "Applications of plane-wave destruction filters," *Geophysics*, 67(6):1946-1960, 2002.

PCT Search Report, dated Nov. 12, 2009, Application No. PCT/US2008/067729.

Examination Report of Australian Application No. 2008270736 dated Dec. 21, 2012: pp. 1-7.

* cited by examiner

ESTIMATING AND USING SLOWNESS VECTOR ATTRIBUTES IN CONNECTION WITH A MULTI-COMPONENT SEISMIC GATHER

BACKGROUND

The invention generally relates to estimating and using slowness vector attributes in connection with a multi-component seismic gather.

Seismic exploration involves surveying subterranean geological formations for hydrocarbon deposits. A survey typically involves deploying seismic source(s) and seismic sensors at predetermined locations. The sources generate seismic waves which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (geophones), and industrial surveys may deploy only one type of sensors or both. In response to the detected waves, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In a first type of marine survey, called a "towed-array" survey, an array of streamers and sources is towed behind a survey vessel. In a second type of marine survey, an array of seismic cables, each of which includes multiple sensors, is laid on the ocean floor, or sea bottom; and a source is towed behind a survey vessel.

Historically, towed-array seismic surveys only employed pressure waves, and the sensors detected passing pressure wavefronts. The art has recently begun moving to "multi-component" surveys in which the sensors also detect particle velocities.

SUMMARY

In an embodiment of the invention, a technique includes determining at least one attribute of a slowness vector associated with a seismic gather based on pressure data and data indicative of particle motion, which are measured by at least one seismic sensor while in tow.

In another embodiment of the invention, a system includes an interface and a processor. The interface receives pressure data and data indicative of particle motion, which are measured by at least one seismic sensor in tow. The processor determines at least one attribute of a slowness vector associated with a seismic gather based on the pressure data and particle motion data.

In yet another embodiment of the invention, an article includes a computer accessible storage medium to store instructions that when executed by a processor-based system causes the processor-based system to determine at least one attribute of a slowness vector associated with a seismic gather based on pressure data and data indicative of particle motion, which are measured by at least one seismic sensor while in tow.

Advantages and other features of the invention will become apparent from the following drawing, description and claims.

DETAILED DESCRIPTION

Figure 1:
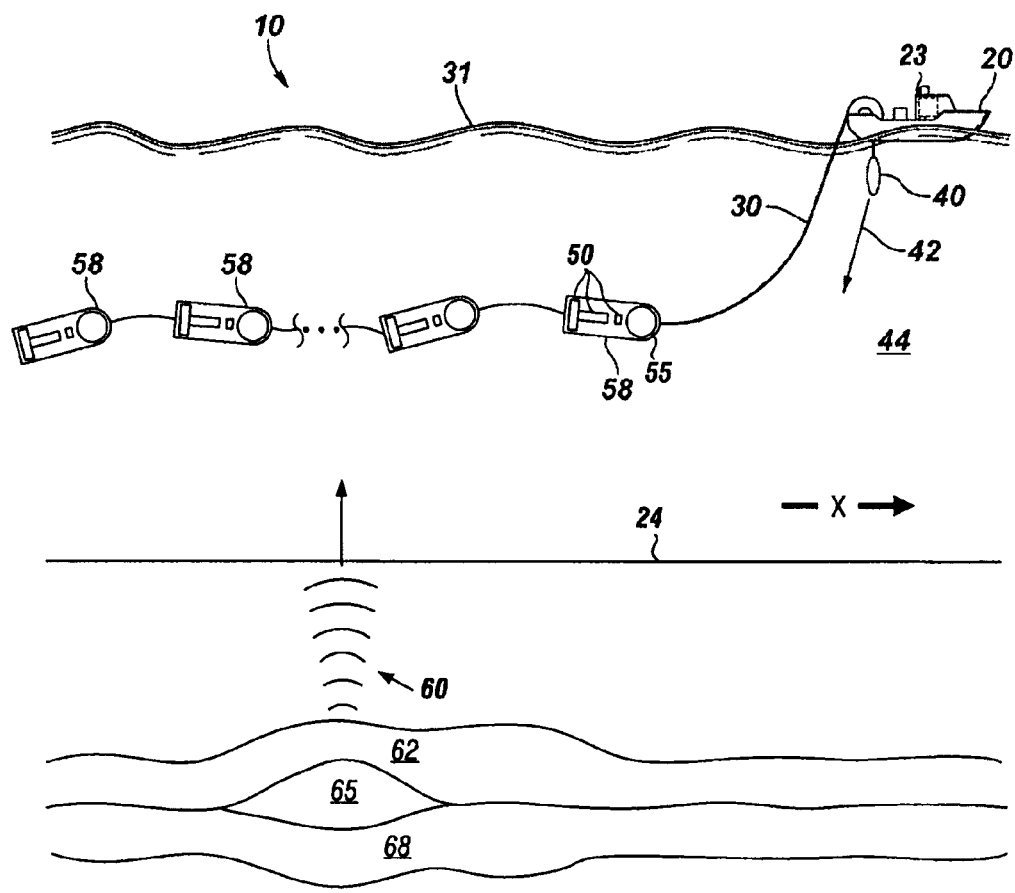
FIG. 1 is a schematic diagram of a marine seismic acquisition system according to an embodiment of the invention.

FIG. 1 depicts an embodiment 10 of a marine seismic data acquisition system in accordance with some embodiments of the invention. In the system 10, a survey vessel 20 tows one or more seismic streamers 30 (one exemplary streamer 30 being depicted in FIG. 1) behind the vessel 20. The seismic streamers 30 may be several thousand meters long and may contain various support cables (not shown), as well as wiring and/or circuitry (not shown) that may be used to support communication along the streamers 30.

Each seismic streamer 30 contains multi-component seismic sensors 58, each of which is capable of detecting a pressure wavefield and at least one component of a particle motion that is associated with acoustic signals that are proximate to the multi-component seismic sensor 58. Examples of particle motions include one or more components of a particle displacement, one or more components (inline (x), crossline (y) and depth (z) components, for example) of a particle velocity and one or more components of a particle acceleration.

Depending on the particular embodiment of the invention, the multi-component seismic sensor 58 may include one or more hydrophones, geophones, particle displacement sensors, particle velocity sensors, accelerometers, or combinations thereof.

For example, in accordance with some embodiments of the invention, a particular multi-component seismic sensor 58 may include a hydrophone 55 for measuring pressure and three orthogonally-aligned accelerometers 50 to measure three corresponding orthogonal components of particle velocity and/or acceleration near the seismic sensor 58. It is noted that the multi-component seismic sensor 58 may be implemented as a single device (as depicted in FIG. 1) or may be implemented as a plurality of devices, depending on the particular embodiment of the invention.

In accordance with some embodiments of the invention, the towed streamers may be a densely sampled point receiver system.

The marine seismic data acquisition system 10 includes one or more seismic sources 40 (one exemplary source 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are generated by the sources 40 produce corresponding reflected acoustic signals, or pressure waves 60, which are sensed by the multi-component seismic sensors 58. It is noted that the pressure waves that are received and sensed by the seismic sensors 58 may be primary pressure waves that propagate to the sensors 58 without reflection, as well as secondary pressure waves that are produced by reflections of the pressure waves 60, such as pressure waves that are reflected from an air-water boundary 31.

In accordance with some embodiments of the invention, the seismic sensors 58 generate signals (digital signals, for example), called "traces," which indicate the detected pressure waves. The traces are recorded and may be at least partially processed by a signal processing unit 23 that is deployed on the survey vessel 20, in accordance with some embodiments of the invention. For example, a particular multi-component seismic sensor 58 may provide a trace, which corresponds to a measure of a pressure wavefield by its hydrophone 55 and may provide one or more traces, which correspond to one or more components of particle motion, which are measured by its accelerometers 50.

Figure 17:
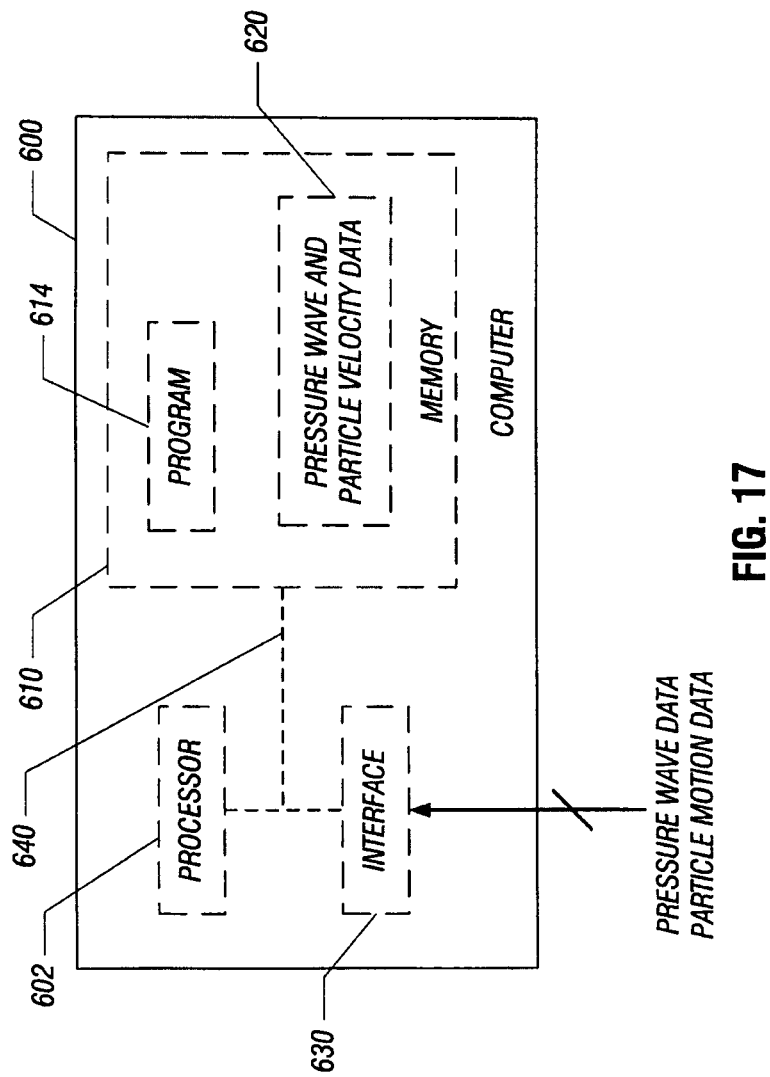
FIG. 17 is a schematic diagram of a seismic data processing system according to embodiments of the invention.

The goal of the seismic acquisition is to build up an image of a survey area for purposes of identifying subterranean geological formations, such as the exemplary geological formation 65. Subsequent analysis of the representation may reveal probable locations of hydrocarbon deposits in the subterranean geological formations. Depending on the particular embodiment of the invention, portions of the analysis of the representation may be performed on the seismic survey vessel 20, such as by the signal processing unit 23. However, in accordance with other embodiments of the invention, the representation may be further processed by a seismic data processing system (such as an exemplary seismic data processing system 600 that is depicted in FIG. 17 and further described below) that may be, for example, located on land. Thus, many variations are possible and are within the scope of the appended claims.

Figure 2:
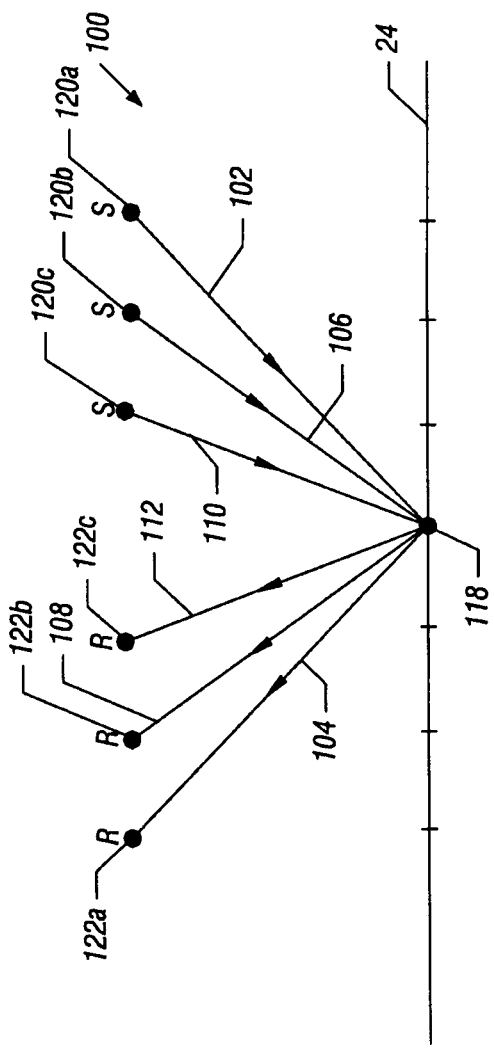
FIG. 2 illustrates the geometry associated with a common midpoint seismic gather according to an embodiment of the invention.

Seismic data that shares a common geometry, called a gather, is processed for purposes of determining information about a particular spot of the survey area. As a more specific example, FIG. 2 depicts a geometry 100 of an exemplary common midpoint (CMP) seismic gather according to some embodiments of the invention. The seismic gather may be processed to yield information about a midpoint 118 of the geometry 100. In the course of acquiring seismic data, the towed streamers 30 (see also FIG. 1) acquire many such CMP midpoint gathers, for purposes of obtaining information about other points of the survey area.

The traces that are obtained from the CMP seismic gather may be stacked together, for purposes of improving the signal-to-noise ratio of the measurement. However, before traces of the seismic gather are stacked or otherwise processed, the traces may first be aligned in time (called "moveout correction") to account for different source-to-receiver offsets that are present in the geometry 100.

More specifically, the geometry 100 is formed from different source-receiver pairs that share the midpoint 118 in common. FIG. 2 depicts three exemplary source positions 120a, 120b and 120c and three corresponding exemplary receiver positions 122a, 122b and 122c. The receiver and source positions correspond to various positions of the sources 40 (see FIG. 1) and multi-component sensors 58 (see FIG. 1) during the towing of the streamers 30.

The source positions 120a, 120b and 120c are associated with the receiver positions 122a, 122b and 122c, respectively. As can be seen from FIG. 2, each source-receiver pair is separated by a different distance, or offset. This offset, in turn, directly affects the time for a signal to propagate from the source position to the receiver position.

For example, from the source position 120a, the shot propagates through a path 102 to the midpoint 118, where a corresponding reflected pressure wave is produced, which propagates along a path 104 to the receiver position 122a. The shot that propagates from the source position 120b follows a shorter path, in that the shot propagates along a path 106 to the midpoint 118 to produce a corresponding reflection wave that propagates along a path 108 to the receiver position 122b. The offset between the source position 120c and receiver position 122c is the smallest possible, as a shot propagates from the source position 120c along a path 110 to the midpoint 118 to produce a corresponding reflection wave that propagates along a path 112 to the receiver position 122c.

Thus, the trace that is associated with the receiver position 122c is associated with the smallest propagation time, and the trace that is associated with the receiver position 122a is associated with the longest propagation time.

Figure 3:
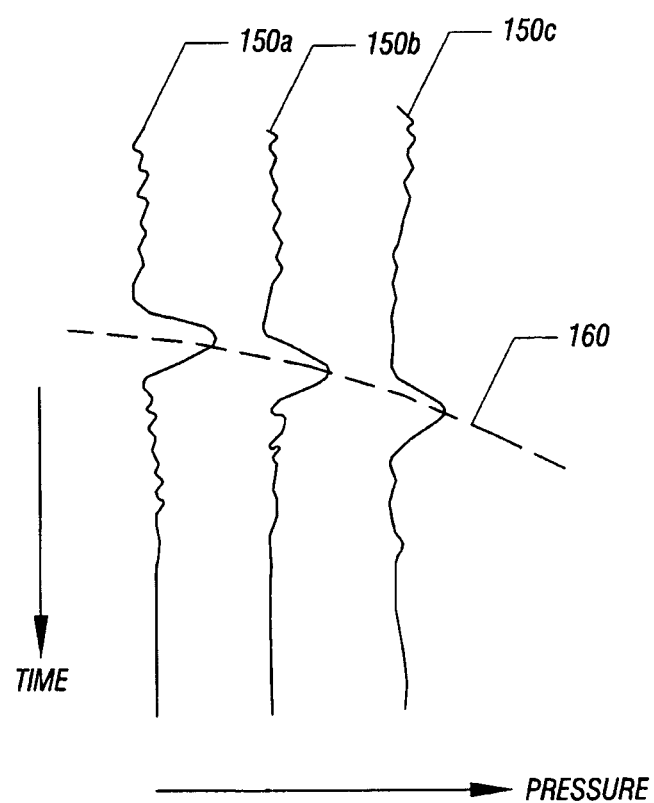
FIG. 3 is an illustration of exemplary traces associated with a seismic gather.

As a result of the different source-receiver offsets, the corresponding traces of the gather are offset in time with respect to each other. For example, referring to FIG. 3 in conjunction with FIG. 2, the sensors 50 (FIG. 1) that are associated with pressure waves at the receiver positions 122c, 122b and 122a produce corresponding traces 150a, 150b and 150c, which are depicted in FIG. 3. As shown, each of the traces 150a, 150b and 150c are offset in time with respect to each other, corresponding to the different source-to-receiver offsets. The timing between the traces 150a, 150b and 150c follows a moveout curve 160, which may be represented by a mathematical function (a hyperbolic function, for example).

Traditionally, velocity analysis has been applied to measured pressure data for purposes of selecting a mathematical formula-based model movement curve that characterizes the timing between the traces 150a, 150b and 150c; and the data in a seismic gather is time-shifted in a process (called "moveout correction") based on the model moveout curve. Therefore, the choice of the mathematical function that forms the model moveout curve typically significantly affects the overall quality of the processed seismic data.

A characterizing parameter of the moveout curve is its "local slope," which is the inline component of the slowness vector (also called the direction of propagation vector) of the detected pressure wavefield. In general, the slowness vector (at the receiver) may be represented in terms of inline (x), crossline (y) and depth (z) coordinates, and time (t) as follows:

$$\text{Slowness\_vector} = \frac{\partial t}{\partial x}\hat{x} + \frac{\partial t}{\partial y}\hat{y} + \frac{\partial t}{\partial z}\hat{z}, \quad \text{Eq. 1}$$

Thus, the local slope, called "$p_x$" herein, is equal to the inline (x) component of the (receiver-side) slowness vector, or $$\frac{\partial t}{\partial x}.$$

A similar definition applies in common receiver gathers for the source-side slowness vector.

In accordance with embodiments of the invention described herein, the multi-component data (i.e., pressure and particle velocity data) that is obtained via the towed streamers 30 is processed to obtain estimates of the local slope independently from the model moveout curve; and as described below, these estimates may be used to evaluate the model curve for purposes of seismic event detection.

Figure 4:
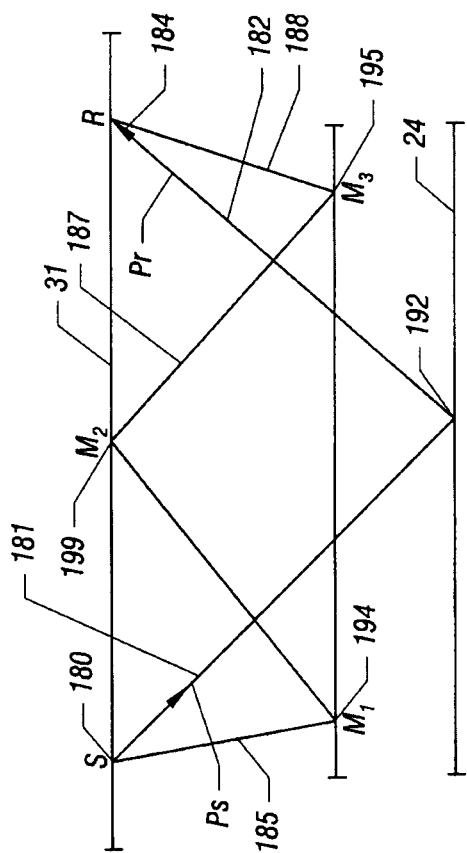
FIG. 4 is an illustration of primary and free surface multiple events.

As further described below, estimates of one or more components of the slowness vector may be used for purposes other than moveout correction. For example, an estimate of the slowness vector may be used to remove "multiples," which are caused by reflections. A potential scenario in which multiples may occur is depicted in FIG. 4. The slowness vector (called "$p_s$") at a source 180 and the slowness vector (called "$p_r$") at a receiver 184 may be used for purposes of discriminating primary waves from reflected waves, as the primary and reflected waves may have the same travel time between the source 180 and the receiver 184 but are distinguished by their associated slowness vectors.

As depicted in FIG. 4, a primary wave may follow a primary raypath 181 from the source 180 to a midpoint 192 at the water bottom surface 24 where the primary wave is reflected along a raypath 182 to the receiver 184. The same shot from the source 180 may produce a secondary wave that follows a raypath 185 to a point 194 at which the wave is reflected to produce a wave along a wave path 186. As shown in FIG. 4, this wave is reflected at a point 199 at the air-water surface 31 to produce a corresponding reflected wave that propagates along a raypath 184 to another point 195, which produces a reflected wave that propagates along the raypath 188 to the receiver 184. As depicted in FIG. 4, the source $p_s$ and receiver $p_r$ slowness vectors may be used to distinguish the primary from the secondary waves, although the primary and secondary waves have the same travel time.

Other applications that benefit from estimating attributes of the slowness vector estimate are described below.

The components of the slowness vector may be estimated from time derivatives of the measured pressure and particle velocity data (i.e., the multi-component data). More specifically, assume a pressure wave is represented by the function P(x, y, z, t), where "x" represents the in-line direction, "y" represents the cross-line direction, "z" represents the vertical direction and "t" represents time. In seismic multi-component acquisitions, the spatial derivatives of the P(x, y, z, t) function may be directly calculated from the measured particle velocities. For example, the partial derivative of the P(x, y, z, t) function with respect to the in-line direction may be represented as follows:

$$\frac{\partial P(x, y, z, t)}{\partial x} = \rho \dot{V}_x(x, y, z, t), \quad \text{Eq. 2}$$

where "$\rho$" represents the density of the medium (assumed to be homogeneous); and "$\dot{V}_x$" represents the time derivative of the measured particle velocity $V_x$(x, y, z, t) (i.e., the inline(x) component of the measured particle velocity). As another example, the partial derivative of the P(x, y, z, t) function with respect to the cross-line direction may be calculated as follows:

$$\frac{\partial P(x, y, t)}{\partial y} = \rho \dot{V}_y(x, y, t), \quad \text{Eq. 3}$$

where "$\dot{V}_y(x,y,t)$" represents the time derivative of the measured particle velocity $V_y$(x,y,t) (i.e., the crossline (y) component of the measured particle velocity).

Figure 5:
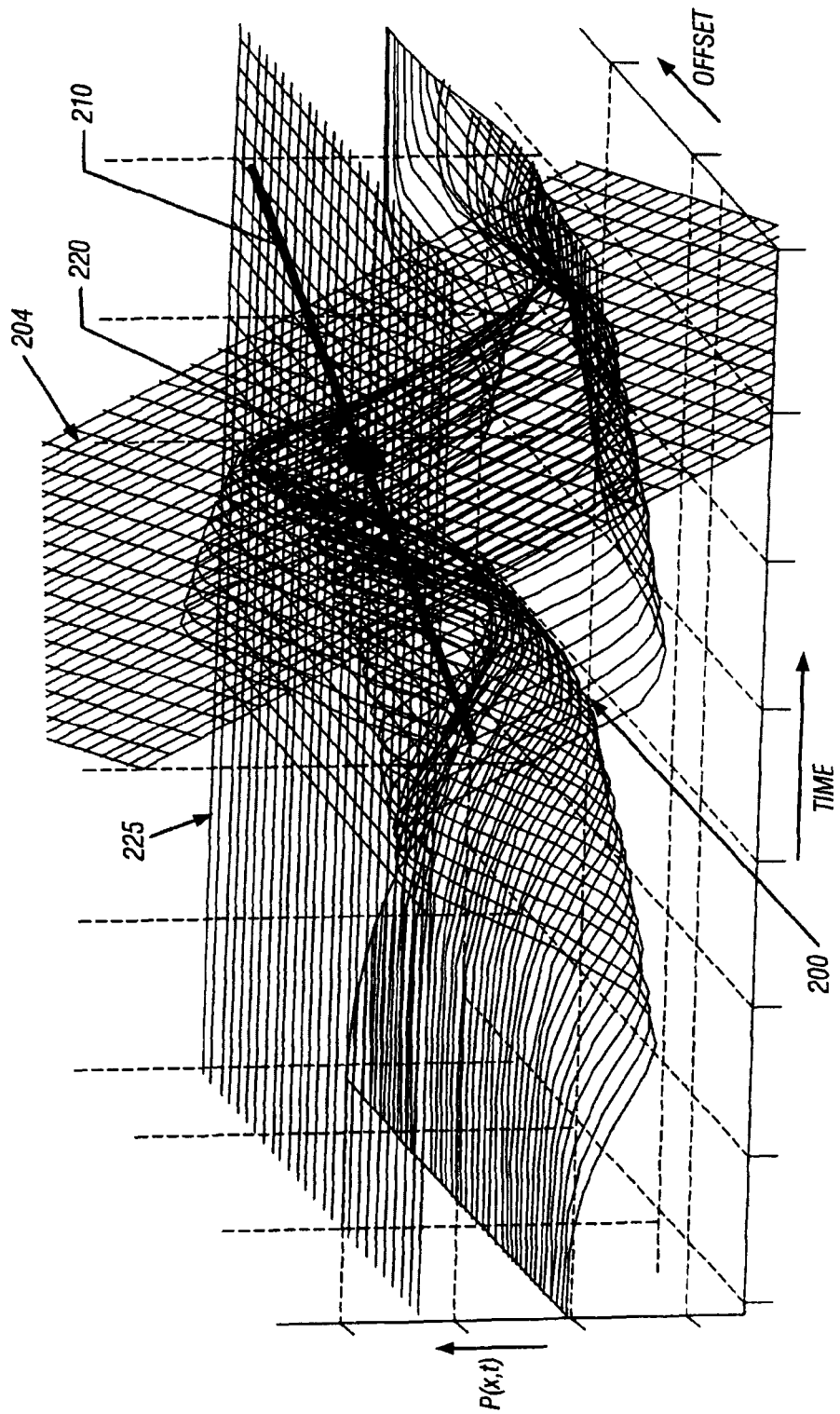
FIG. 5 is a perspective view of a pressure wave illustrating the definition of a local slope according to an embodiment of the invention.

Given the above-described relationships between the time and spatial derivatives, the components of the slowness vector may be calculated as follows, with a specific example being illustrated in FIG. 5 for an exemplary two-dimensional (2-D) pressure function P(x,t). The P(x,t) function is illustrated in FIG. 5 by an exemplary pressure wave 200. At point ($\bar{x},\bar{t}$) (at reference numeral 206) the associated slowness vector has an inline component, or local slope, which is parallel to a line 210. By representing the time derivative of the P(x,t) function as $$P_t(x, t) = \dot{P} = \frac{\partial P}{\partial t}$$

and the spatial derivative of the P(x,t) function by $$P_x(x, t) = \frac{\partial P}{\partial x},$$

a tangent plane 204 may be represented by a function π, which is described by the following linear equation:

$$\pi : |z(x,t) = P_x(\bar{x},\bar{t})(x-\bar{x}) + P_t(\bar{x},\bar{t})(t-\bar{t}) + P(\bar{x},\bar{t}). \quad \text{Eq. 4}$$

The local slope of the P(x,t) function at the point $(\overline{x}, \overline{t})$ may be identified using the line 210, a line that is tangent at $(\overline{x}, \overline{t})$ to the P(x,t) function and is parallel to the horizontal plane 225 $(z=\overline{z}=P(\overline{x}, \overline{t}))$. The line 210 is obtained as the intersection between the tangent plane 204 and the pressure wave 200. Mathematically, the line 210 may be represented by a function r, which is set forth below:

$$r: | \, t(x, \overline{z}) = -\frac{P_x(\overline{x}, \overline{t})}{P_t(\overline{x}, \overline{t})}(x - \overline{x}) + \overline{t}, \qquad \text{Eq. 5}$$

The local slope, or the slope of the line 210 may be represented by a function m(x,t), as follows:

$$m(x, t) = \frac{\partial t}{\partial x} = -\frac{P_x(x, t)}{P_t(x, t)}. \qquad \text{Eq. 6}$$

In terms of the available multi-component data, Eq. 6 may be rewritten as follows:

$$m(x, t) = \frac{\rho \dot{V}_x(x, t)}{\dot{P}(x, t)}, \qquad \text{Eq. 7}$$

Figure 6:
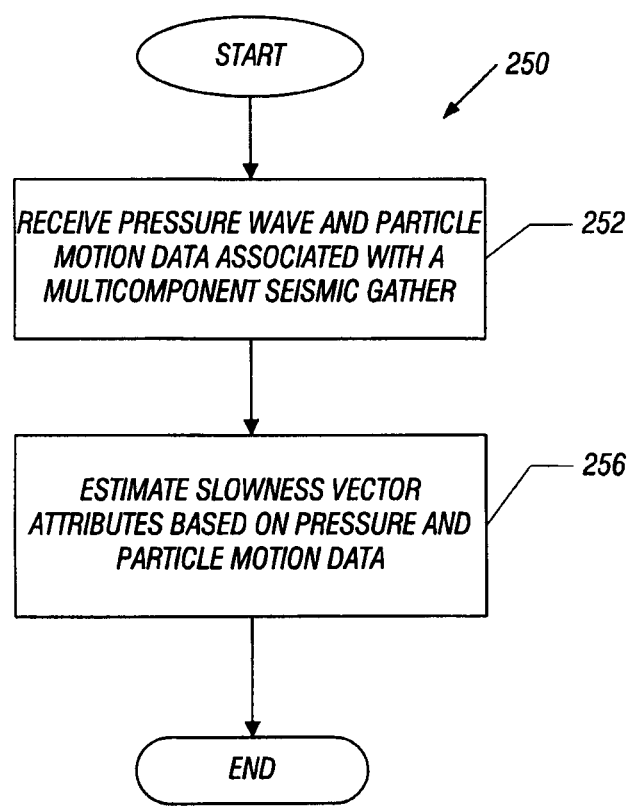
FIGS. 6 and 7 are flow diagrams depicting techniques to estimate the local slope from multi-component measurements according to embodiments of the invention.

Referring to FIG. 6, to summarize, in accordance with some embodiments of the invention, a technique 250 includes receiving pressure wave and particle velocity data that are associated with a multi-component seismic gather, pursuant to block 252. Estimates of slowness vector attributes (such as local slope) may then be estimated (block 256) based on the pressure wave and particle velocity data.

Figure 7:
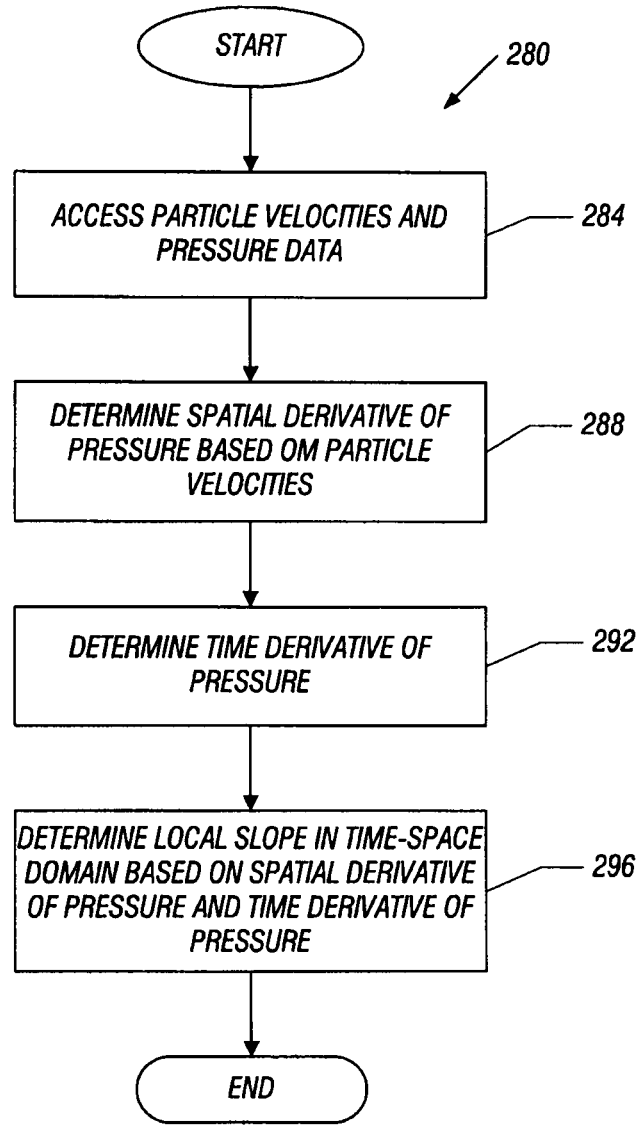

More specifically, in accordance with some embodiments of the invention, a technique 280 that is depicted in FIG. 7 may be used for purposes of determining the local slope. Pursuant to the technique 280, particle velocity and pressure data is accessed (block 284); and the spatial derivatives of the pressure are determined based on the particle velocities, pursuant to block 288. Next, the time derivative of the pressure is determined (block 292); and subsequently the local slope in the time-space domain is determined (block 296) based on the spatial derivative pressure and the time derivative of pressure.

It is noted that crossline (y) and depth (z) components of the slowness vector may be estimated in a similar manner.

Figure 8:
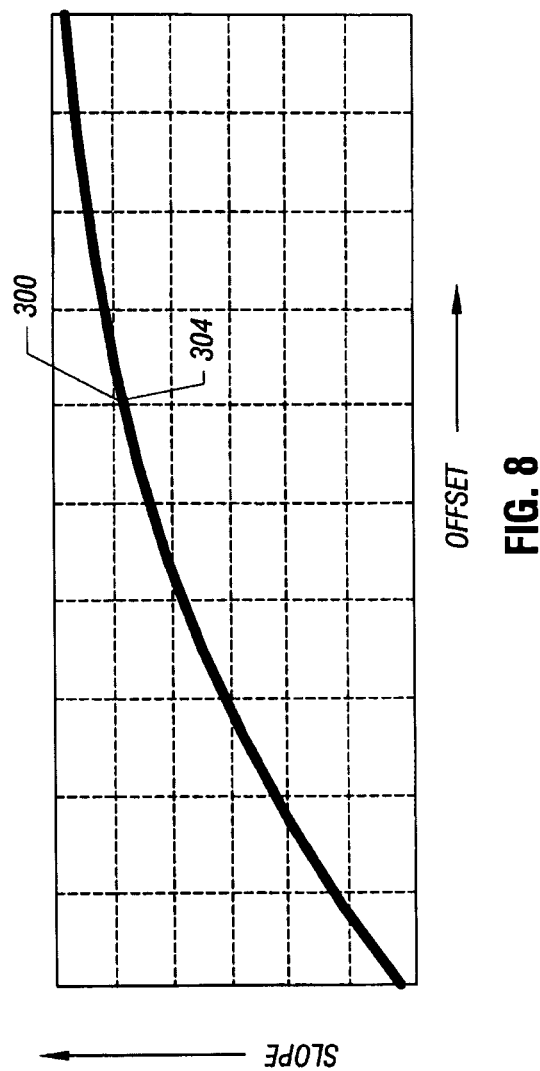
FIG. 8 depicts plots of the local slope as obtained from a mathematical model and estimated from a synthesized seismic gather.

FIG. 8 depicts a plot 304 of estimated local slopes obtained from data that was produced in a synthesized multi-component seismic gather pursuant to the techniques that are described above. As can been seen, the plot 304 closely matches a local slope curve 300, which is derived from a mathematical formula-based model moveout curve.

The estimation of the slowness vector from the multi-component (particle motion and pressure) measurements is a departure from the traditional scheme of estimating the slowness vector, in which only pressure measurements are used. More specifically, the traditional technique for estimating the slowness vector is the local slant stack. Plane-wave annihilation filters may be applied, such as the one set forth below in Eq. 8 for purposes of obtaining better estimates using this traditional approach:

$$p_x \frac{\partial P}{\partial t} + \frac{\partial P}{\partial x} \approx 0, \text{ or } p_x \frac{\partial P}{\partial t} + \frac{\partial P}{\partial t} \approx 0, \qquad \text{Eq. 8}$$

Slowness vector components may be obtained from Eq. 8 by minimizing the residuals (i.e., the right hand side of the equation) in a least squares sense. More specifically, the slowness vectors may be estimated for interfering plane waves by convolutions of plane wave annihilation filters. In this regard, a wave field that is the sum of two plane waves is annihilated by the convolution of the annihilation filters for each of the two plane waves.

The traditional techniques, if applied to three-dimensional (3-D) marine acquisition, are strongly subject to leakage in crossline direction. Because these traditional techniques stack the coherence of data along known curves, the modeling of such curves is a key factor for the quality of the analysis results.

The estimation of the local slope from multi-component data may be used to evaluate the reliability of the events that are detected by traditional techniques and may be used to reduce the leakage in the crossline direction.

More specifically, traditional techniques evaluate coherency using a semblance formulation, called "$S(x_0, q, t_0)$," such as the following:

$$S(x_0, q, t_0) = \frac{\left[\sum_{k=1}^{N_k} P\!\left(t = \sqrt{t_0^2 + q(x_k - x_0)^2}, x_k\right)\right]^2}{N_k \left[\sum_{k=1}^{N_k} P\!\left(t = \sqrt{t_0^2 + q(x_k - x_0)^2}, x_k\right)^2\right]}, \qquad \text{Eq. 9}$$

where "$t_0$" is the zero-offset travel-time, "q" is the curvature, "$x_0$" is the curve-apex position, "$x_k$" is the k-th receiver position, and "$N_k$" is the number of receivers.

The $S(x_0, q, t_0)$ semblance formulation evaluates the coherency of the measured pressure data along the following hyperbolic moveout curve:

$$t(x, t_0, q, x_0) = \sqrt{t_0^2 + q(x - x_0)^2}, \qquad \text{Eq. 10}$$

which has the following local slope:

$$m(x, t_0, q, x_0) = \frac{\partial t}{\partial x} = \frac{q(x - x_0)}{\sqrt{t_0^2 + q(x - x_0)^2}}. \qquad \text{Eq. 11}$$

Thus, if a seismic event is matched by the modeled curve (Eq. 10), then the estimated local slopes of the measured pressure signal along the curve should match the values obtained from Eq. 11.

An operator called $Sl_{MSE}(x_0, q, t_0)$ may be used to evaluate how the slopes of the detected event respect their theoretical values (i.e., values obtained from Eq. 11). The $Sl_{MSE}(x_0, q, t_0)$ operator calculates a mean square error (MSE) between these slopes and is normalized with respect to the mean square theoretical slope. The $Sl_{MSE}(x_0, q, t_0)$ operator may be described as follows:

$$Sl_{MSE}(x_0, q, t_0) = \qquad \text{Eq. 12}$$

-continued $$\frac{\left(\left(\sum_{k=1}^{N_k}\frac{q(x_k-x_0)}{\sqrt{t_0^2+q(x_k-x_0)^2}}+\frac{\rho\dot{V}_x\left(t=\sqrt{t_0^2+q(x_k-x_0)^2},x_k\right)}{\dot{P}\left(t=\sqrt{t_0^2+q(x_k-x_0)^2},x_k\right)}\right)^2\right)}{\left(\sum_{k=1}^{N_k}\left(\frac{q(x_k-x_0)}{\sqrt{t_0^2+q(x_k-x_0)^2}}\right)\right)},$$

Another operator called $R(x_0, q, t_0)$ may be used for purposes of detecting events that exhibit high semblance and low slope errors. The $R(x_0, q, t_0)$ operator may be described as follows:

$$R(x_0, q, t_0) = \frac{\lambda S(x_0, q, t_0)}{\lambda + Sl_{MSE}(x_0, q, t_0)}, \quad \text{Eq. 13}$$

where "$\lambda$" has the role to balance the influence of S and $Sl_{MSE}$, and may also be used to mute or reduce the effect of the $Sl_{MSE}$ operator when it is expected to be too noisy.

The above-described techniques may be extended to the third dimension in the case of three-dimensional (3-D) datasets, and the above-described techniques may be applied to different modeling domains, alternative to the hyperbolic parameters $(x_0, q, t_0)$.

Figure 9:
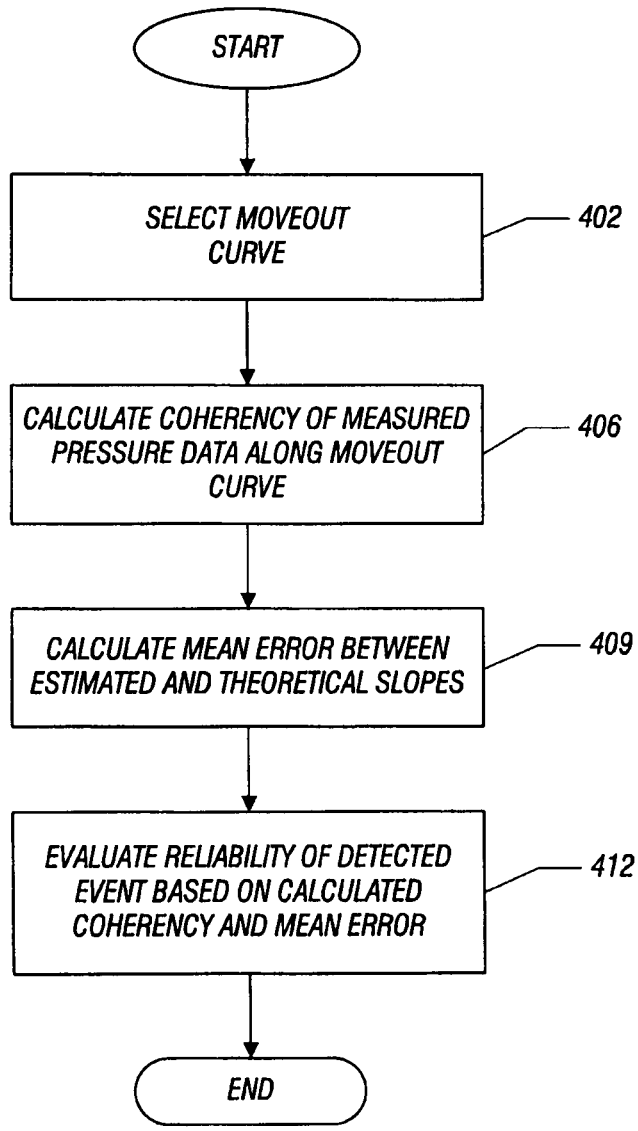
FIG. 9 is a flow diagram depicting a technique to improve detection of a seismic event according to an embodiment of the invention.

Referring to FIG. 9, to summarize, the direct calculation of the local slope from the multi-component data may be used to improve the detection of seismic events pursuant to a technique 400. In this regard, a particular seismic event may be captured by multi-component data; and a moveout curve is selected, pursuant to block 402. A coherency of the measured pressure data is calculated (block 406) along the moveout curve; and a mean error between the slopes is calculated directly from the multi-component data and the slopes predicted by the moveout curve are calculated (block 409). The reliability of the detected event is then evaluated based on the calculated coherency and mean error, pursuant to block 412.

Estimates of the slowness vector may be obtained from the multi-component data, recognizing the concept of upgoing and downgoing vertical velocity components. In this regard, the downgoing vertical velocity may be described as follows:

$$D^{V_z} = \frac{1}{2}\left(V_z + \frac{p_z}{\rho}P\right), \quad \text{Eq. 14}$$

In a similar manner, the upgoing $V_z$ vertical velocity may be described as follows:

$$U^{V_z} = \frac{1}{2}\left(V_z - \frac{p_z}{\rho}P\right), \quad \text{Eq. 15}$$

An algebraic combination of Equations 14 and 15 produces the following estimator for the slowness vector based on the upgoing and downgoing $V_z$ velocity measurements:

$$Pp_z = \rho(D^{V_z} - U^{V_z}), \quad \text{Eq. 16}$$

Thus, Eq. 16 is an example of a technique to estimate the slowness vector based on upgoing and downgoing waves. The equation may be implemented in space-time, leading to a system of equations to be solved for slowness vector. It is noted that the inline (x) component of the slowness vector may be derived from the $p_z$ component due to the following relationship:

$$p \wedge V = 0, \text{ e.g., } p_x V_z - p_z V_x = 0, \quad \text{Eq. 17}$$

Equation 17 is based on the fact that the cross product of the velocity and slowness vectors is zero, due to the vectors being parallel to each other.

Figure 10:
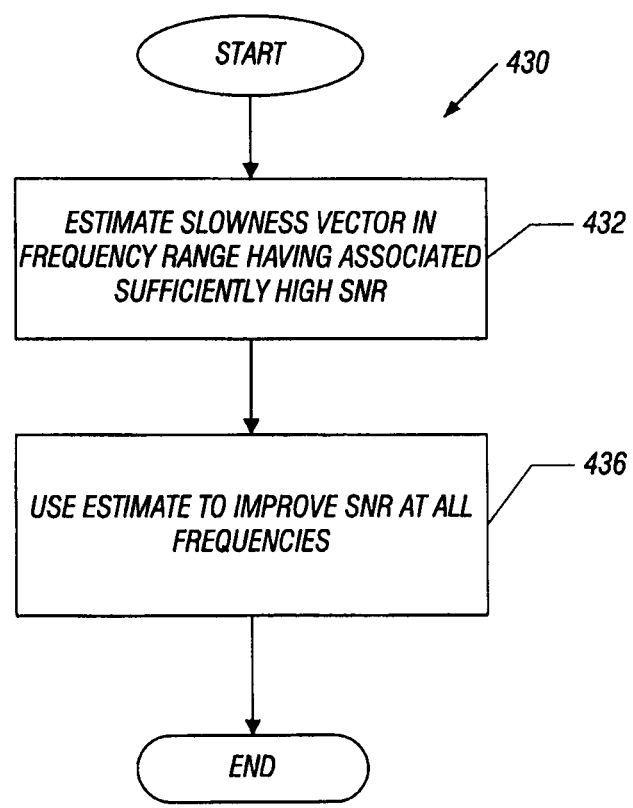
FIG. 10 is a flow diagram depicting a technique to use a slowness vector estimate to remove noise according to an embodiment of the invention.

For purposes of improving the slowness vector estimate, any of the above-described techniques may be used in connection with frequency ranges that are associated with higher signal-to-noise ratios (SNRs). More specifically, referring to FIG. 10, in accordance with some embodiments of the invention, a technique 430 may be used for purposes of removing noise from multi-component seismic measurements. Pursuant to the technique 430, the slowness vector is estimated (block 432) in a frequency range that has an associated sufficiently high signal-to-noise ratio (SNR), as compared to the other frequencies. It is assumed that the slowness vector is a broadband attribute. Therefore, in frequency bands in which the SNR is relatively low, the slowness vector estimate is used to improve the SNR at these frequencies, pursuant to block 436. More specifically, the slowness vector estimate is used to enforce consistency between the multi-component measurements.

Besides being used to improve event detection and enforce consistency between multi-component measurements, the slowness vector estimates that are derived from the multi-component data may have the following additional applications.

The spatial derivatives of the pressure wavefield may be used in interpolation schemes. When the slowness vector estimate is available, the following relationship may be used to replace potentially noise-contaminated velocity measurements or pressure wavefield space derivatives with pressure wave field time derivatives, as set forth below:

$$\frac{\partial P}{\partial x} = -p_x\frac{\partial P}{\partial t}. \quad \text{Eq. 18}$$

Figure 11:
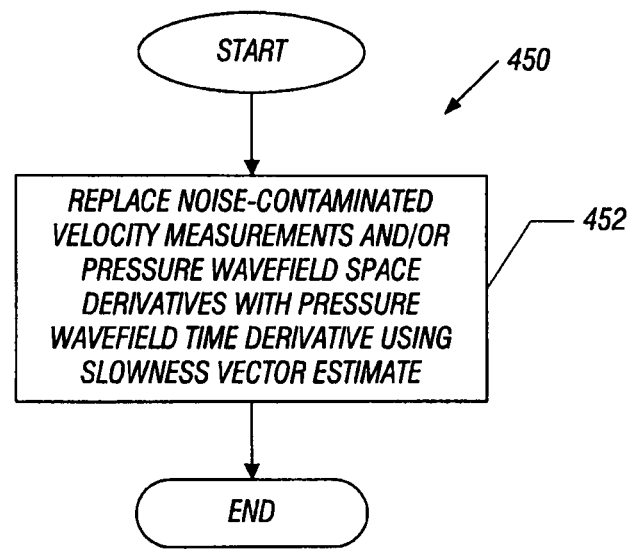
FIG. 11 is a flow diagram depicting a technique to use a slowness vector estimate to replace measurements associated with interpolation according to an embodiment of the invention.

Thus, referring to FIG. 11, in accordance with some embodiments of the invention, a technique 450 includes replacing (block 452) noise-contaminated velocity measurements and/or pressure wave field space derivatives with pressure wavefield time derivatives, using the slowness vector estimate, pursuant to block 452.

Figure 12:
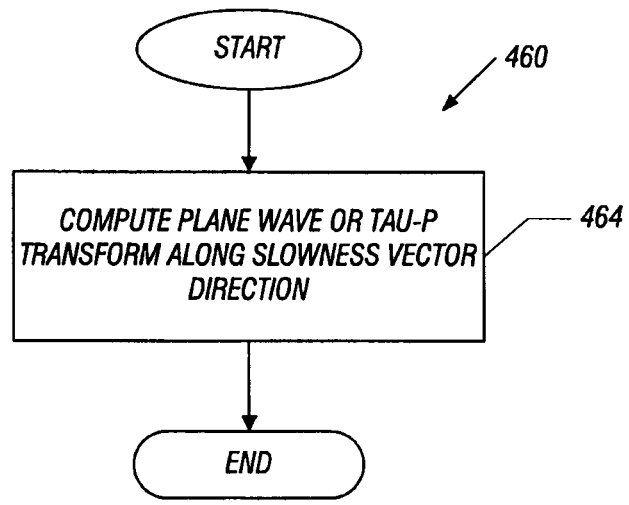
FIG. 12 is a flow diagram depicting a technique to use a slowness vector estimate in a filtering application according to an embodiment of the invention.

In the course of seismic processing, it may be advantageous to compute plane wave or tau-p transforms. These transforms are usually performed by the summation of data along a range of pre-defined trajectories. When the slowness vector estimate is available, the transforms may be computed along the slowness vector direction. The resultant computations are relatively fast and may have fewer transform-related artifacts than the artifacts that are produced via conventional techniques. Thus, referring to FIG. 12, in accordance with some embodiments of the invention, a technique 460 includes computing (block 464) the plane wave or tau-p transform along the slowness vector direction, pursuant to block 464.

Because the tau-p and Fourier transforms are related, the above-described approach provides an alternative way of computing Fourier transforms as well. Thus, following these transforms, events may be separated according to their slowness vectors.

Figure 13:
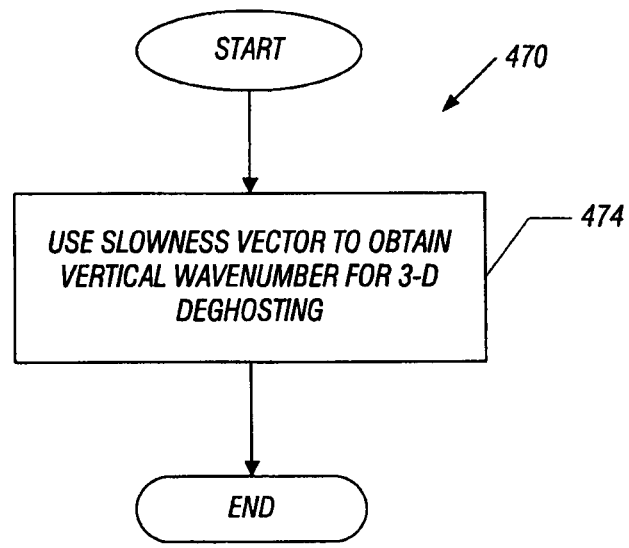
FIG. 13 is a flow diagram depicting a technique to use a slowness vector estimate in a deghosting application according to an embodiment of the invention.

Referring to FIG. 13, in accordance with some embodiments of the invention, a technique 470 may also use the slowness vector estimate for purposes of obtaining a vertical wavenumber for three-dimensional (3-D) deghosting, pursuant to block 474.

Additionally, in accordance with some embodiments of the invention, the slowness vector estimate may be used for purposes of receiver-motion corrections.

Figure 14:
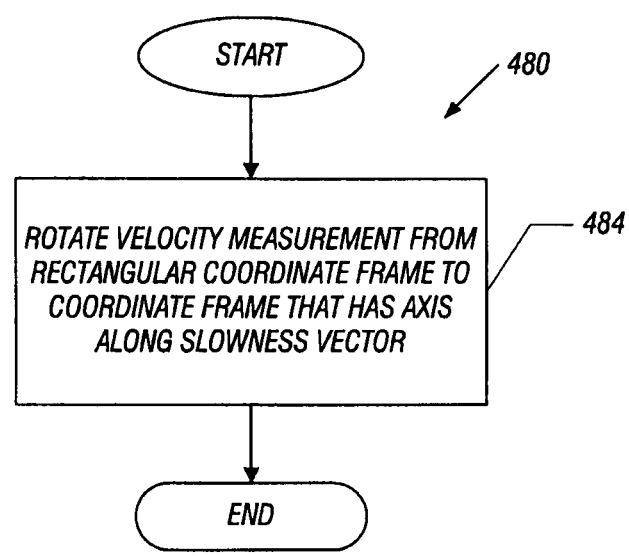
FIG. 14 is a flow diagram depicting a technique to use a slowness vector estimate to rotate the coordinate frame associated with velocity measurements according to an embodiment of the invention.

In accordance with some embodiments of the invention, the slowness vector estimate also permits transformations between coordinate spaces. For example, referring to FIG. 14, in accordance with some embodiments of the invention, a technique 480 includes rotating (block 484) the velocity measurement from a rectangular coordinate space to a coordinate space that has an axis along the slowness vector.

Figure 15:
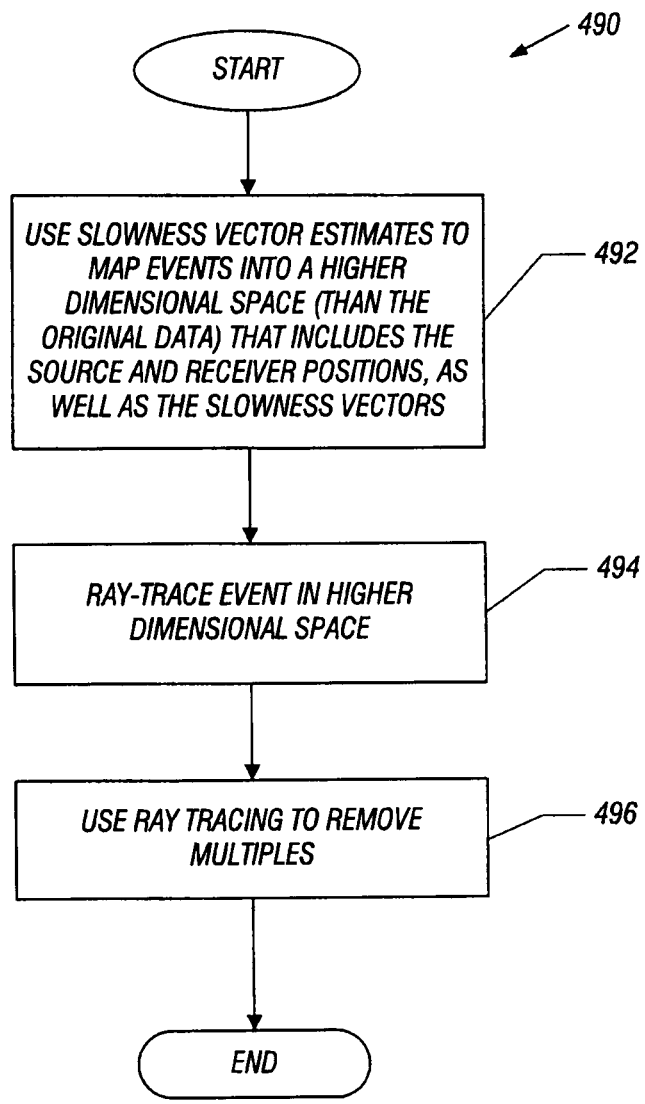
FIG. 15 is a flow diagram depicting a technique to use a slowness vector estimate to estimate errors in a velocity model or indicate non-primary events according to an embodiment of the invention.

Referring to FIG. 15, in accordance with some embodiments of the invention, a technique 490 uses the slowness vector estimate for purposes of indicating possible errors in a velocity model or indicating non-primary events, such as an event that is produced by a reflection of the primary event. More specifically, in accordance with some embodiments of the invention, the technique 490 includes using (block 492) the slowness vector estimate to map events into a higher dimensional space (than the original data) that includes source and receiver positions, as well as the slowness vectors. Thus, the estimates of the slowness vector permit the mapping of the events into a higher dimensional space, which may include the source coordinates, receiver coordinates and time. These events may then be ray traced in the higher dimensional space, pursuant to block 494, and the ray tracing may be used to remove multiples (for example), pursuant to block 496.

Estimates of slowness vectors also allow for the map-migration of events, the testing of hypothesis for raypaths and interpretation of pre-stack events. For example, map migration with constant velocity may be used to identify locations of strong diffractors at the sea floor and further lead to suppression of multiple diffractions.

Figure 16:
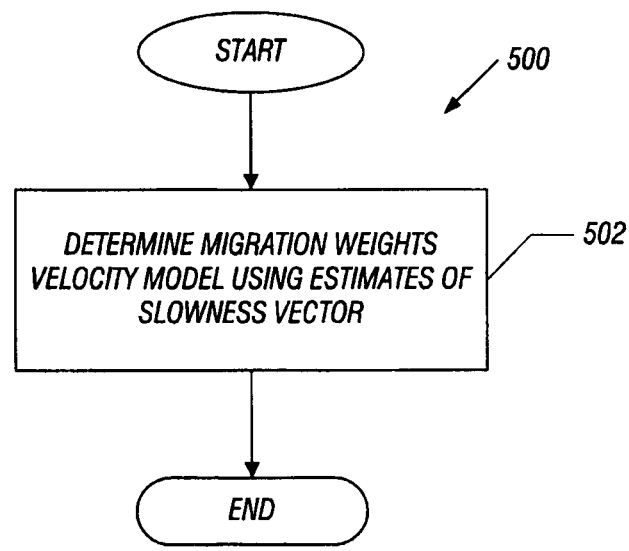
FIG. 16 is a flow diagram depicting a technique to use a slowness vector estimate in an image processing application according to an embodiment of the invention.

Referring to FIG. 16, in accordance with some embodiments of the invention, a technique 500 is used for purposes of image processing. Pursuant to the technique 500, migration weights are determined (block 502) of a velocity model using estimates of the slowness vector.

Referring to FIG. 17, in accordance with some embodiments of the invention, a seismic data processing system 600 may perform one or more of the above-described techniques to generate and use slowness vector estimates. In accordance with some embodiments of the invention, the system 600 may include a processor 602, such as one or more microprocessors or microcontrollers. The processor 602 may be coupled to a communication interface 630 for purposes of receiving the pressure wave data and particle motion data. As examples, the communication interface 630 may be a USB serial bus interface, a network networked interface, a removable media (such as a flash card, CD-ROM, etc.) interface, or a magnetic storage interface (an IDE or SCSI interface, as just a few examples). Thus, the communication interface 630 may take on numerous forms, depending on the particular embodiment of the invention.

The communication interface 630 may be coupled to a memory 610 of the computer 600, which may, for example, store the pressure wave and particle motion data as indicated at reference numeral 620, in accordance with some embodiments of the invention. Additionally, the memory 610 may store at least one application program 614, which is executed by the processor 602 for purposes of estimating and using attributes of the slowness vector pursuant to the techniques that are disclosed herein. The memory 610 and communication interface 630 may be coupled together by at least one bus 640 and may be coupled by a series of interconnected buses and bridges, depending on the particular embodiment of the invention.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
processing, on a processor-based system, pressure data and an indication of particle motion measured by at least one seismic sensor while in tow wherein the processing determines at least one attribute of a slowness vector associated with a seismic gather based on a model of the at least one attribute as a function of pressure and particle motion, the determining comprising determining a spatial derivative of the pressure data based on the indication of the particle motion.

2. The method of claim 1, further comprising processing the pressure data and the indication to determine a change in a pressure travel time with respect to a receiver offset.

3. The method of claim 1, wherein the processing the pressure data and the indication to determine further comprises:
determining a time derivative of the pressure data; and
basing the determination of the at least one attribute on the determination of the time derivative of the pressure data and the determination of the spatial derivative of the pressure data.

4. The method of claim 1, wherein the indication of the particle motion comprises an indication of a velocity.

5. The method of claim 1, wherein the processing comprises processing the pressure data and the indication to determine a local slope, the method further comprising:
determining a slope error based on the determined local scope and a mathematical model of the slope.

6. The method of claim 5, further comprising:
determining a seismic event reliability measure based on the slope error.

7. The method of claim 6, further comprising:
further basing the seismic event reliability measure on a semblance-based coherency measure of the gather.

8. The method of claim 1, further comprising:
determining the at least one attribute of the slowness vector from a frequency range in which an associated signal-to-noise ratio is higher than a signal-to-noise ratio of a second frequency range; and
using the at least one attribute to improve a consistency of the pressure data and the indication of particle motion.

9. The method of claim 1, further comprising:
determining a transform along a direction of the slowness vector.

10. The method of claim 1, further comprising:
rotating a coordinate frame associated with the indication of particle motion to a coordinate frame that includes the slowness vector as an axis that is directed along the slowness vector.

11. The method of claim 1, further comprising:
removing multiples from the seismic gather based on the slowness vector.

12. The method of claim 1, further comprising:
determining migration weights of a velocity model based on the slowness vector.

13. The method of claim 1, wherein the determining the at least one component of the slowness vector comprises:
determining an up going velocity based on the pressure wave data and the indication of particle motion;
determining a down going velocity based on the pressure wave data and the indication of particle motion; and
determining the at least one attribute of the slowness vector in response to a combination of the up going and down going velocities.

14. The method of claim 1, further comprising:
obtaining the pressure wave data and the indication of particle motion from a densely sampled point receiver system.

15. A system comprising:
an interface to receive pressure data and an indication of particle motion measured by at least one seismic sensor in tow; and
a processor to determine at least one attribute associated with a seismic gather based on a model of said at least one attribute as a function of particle motion and pressure, wherein the determination of the at least one attribute includes the processor determining a spatial derivative of the pressure data based on the indication of the particle motion.

16. The system of claim 15, further comprising:
at least one towed streamer comprising at least one seismic sensor to indicate the pressure data.

17. The system of claim 16, wherein the at least one towed streamer comprises at least one multi-component sensor to provide an indication of the particle motion.

18. The system of claim 16, further comprising:
at least one vessel to tow the at least one towed streamer.

19. The system of claim 15, wherein the processor is adapted to determine a change in a pressure wave travel time with respect to a receiver offset.

20. The system of claim 15, wherein the processor is further adapted to:
determine a time derivative of the pressure data; and
base the determination of the at least one attribute on the determination of the time derivative of the pressure data and the determination of the spatial derivative of the pressure data.

21. The system of claim 15, wherein the indication of the particle motion comprises an indication of a velocity.

22. The system of claim 15, wherein the processor is adapted to determine a local slope error based on the at least one attribute of the slowness vector and a mathematical model of the attribute.

23. The system of claim 22, wherein the processor is adapted to determine a seismic event reliability measure based on the slope error.

24. The system of claim 23, wherein the processor is adapted to further base the seismic event reliability measure on a semblance-based coherency measure of the gather.

25. The system of claim 15, wherein the processor is adapted to:
determine the at least one attribute from a frequency range in which an associated signal-to-noise ratio is higher than a signal-to-noise ratio of a second frequency range; and
use the at least one component to improve a consistency of the pressure data and the indication of particle motion.

26. The system of claim 15, wherein the processor is adapted to:
determine a transform along a direction of the slowness vector.

27. The system of claim 15, wherein the processor is adapted to:
rotate a coordinate frame associated with the indication of particle motion to a coordinate frame that includes the slowness vector as an axis that is directed along the slowness vector.

28. The system of claim 15, wherein the processor is adapted to:
remove multiples from the seismic gather based on the slowness vector.

29. The system of claim 15, wherein the processor is adapted to:
determine migration weights of a velocity model based on the slowness vector.

30. The system of claim 15, wherein the processor is adapted to:
determine an up going velocity based on the pressure data and the indication of particle motion;
determine a down going velocity based on the pressure data and the indication of particle motion; and
determine the at least one attribute in response to a combination of the up going and down going velocities.

31. The system of claim 15, wherein the pressure data and the indication of particle motion are obtained from a densely sampled point receiver system.

32. An article comprising a non-transitory, computer-accessible, storage medium to store instructions that when executed by a processor-based system, cause the processor-based system to:
determine at least one attribute of a slowness vector associated with a seismic gather based on a model of said at least one attribute as a function of pressure and particle motion, wherein the determination of the at least one attribute includes determining a spatial derivative of the pressure data based on the indication of the particle motion.

33. The article of claim 32, the storage medium storing instructions that when executed cause the processor-based system to determine a change in a pressure wave travel time with respect to a receiver offset.

34. The article of claim 32, the storage medium storing instructions that when executed cause the processor-based system to:
determine a time derivative of the pressure wave data; and
base the determination of the at least one attribute on the determination of the time derivative of the pressure wave data and the determination of the spatial derivative of the pressure wave data.

35. The article of claim 32, the storage medium storing instructions that when executed cause the processor-based system to determine local slope error based on the at least one attribute and a mathematical model of the attribute.

36. The article of claim 35, the storage medium storing instructions that when executed cause the processor-based system to determine a seismic event reliability measure based on the slope error.

37. The method of claim 1, wherein said at least one seismic sensor comprises multiple seismic sensors, the pressure data and the indication of particle motion are derived from traces acquired by the multiple seismic sensors, and the determination of said at least one attribute of the slowness vector is performed independently from a relative timing of the traces with respect to each other.

38. The system of claim 15, wherein said at least one seismic sensor comprises multiple seismic sensors, the pressure data and the indication of particle motion are derived from traces acquired by the multiple seismic sensors, and the determination of said at least one attribute of the slowness vector is performed independently from a relative timing of the traces with respect to each other.

39. The article of claim 32, wherein said at least one seismic sensor comprises multiple seismic sensors, the pressure data and the indication of particle motion are derived from traces acquired by the multiple seismic sensors, and the determination of said at least one attribute of the slowness vector is performed independently from a relative timing of the traces with respect to each other.

40. A method comprising:
processing pressure data and an indication of particle motion measured by at least one seismic sensor while in tow on a processor-based system to determine at least one attribute of a slowness vector associated with a seismic gather based on pressure data and an indication of particle motion measured by at least one seismic sensor while in tow, the determining comprising determining a spatial derivative of the pressure data based on the indication of the particle motion; and
using the at least one attribute to replace a spatial derivative of a pressure wavefield in an interpolation determination.

41. A system comprising:
an interface to receive pressure data and an indication of particle motion measured by at least one seismic sensor in tow; and
a processor to determine at least one attribute associated with a seismic gather based on the pressure data and the indication of the particle motion,
wherein the determination of the at least one attribute includes the processor determining a spatial derivative of the pressure data based on the indication of the particle motion, and the processor is adapted to use the at least one attribute to replace a spatial derivative of a pressure wavefield in an interpolation determination.

42. The method of claim 1, wherein the pressure data and the indication of particle motion are a seismic wavefield, and further comprising:
based on the slowness vector attribute, computing a vertical wavenumber of the seismic wavefield; and
based on the vertical wavenumber, the pressure data, and the indication of particle motion, separating the seismic wavefield into an upgoing seismic wavefield and a downgoing seismic wavefield.

43. The method of claim 42, further comprising performing deghosting on the seismic wavefield based on the upgoing seismic wavefield and the downgoing seismic wavefield.

44. The method of claim 43, wherein the deghosting is three-dimensional deghosting.

45. The method of claim 1, wherein the pressure data and the indication of particle motion are a seismic wavefield, and further comprising:
based on the slowness vector attribute, computing a angle of incidence of the seismic wavefield; and
based on the angle of incidence, the pressure data, and the indication of particle motion, separating the seismic wavefield into an upgoing seismic wavefield and a downgoing seismic wavefield.

46. The method of claim 45, further comprising performing deghosting on the seismic wavefield based on the upgoing seismic wavefield and the downgoing seismic wavefield.

47. The method of claim 46, wherein the deghosting is three-dimensional deghosting.

\* \* \* \* \*